Sept. 27, 1966  C. E. FRIEND  3,274,706
BOOK HAVING PLASTIC PAGES AND ADHERENT PLASTIC OVERLAYS
Filed April 2, 1964
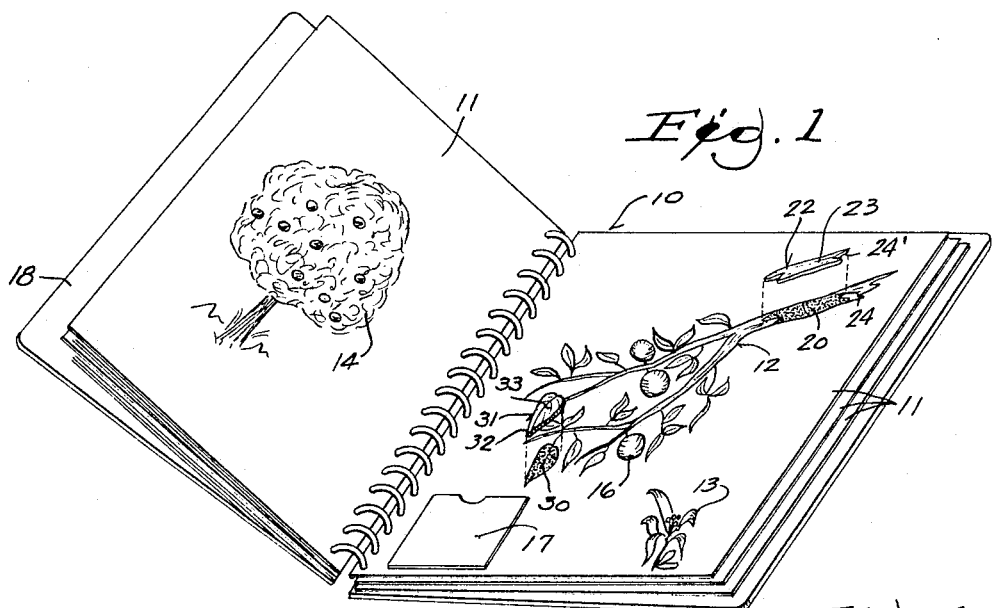
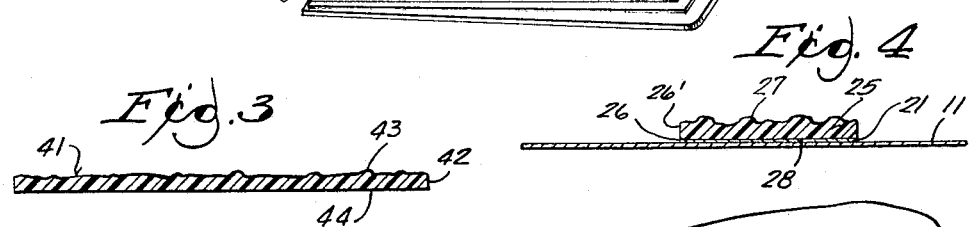
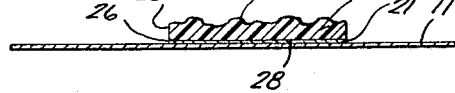
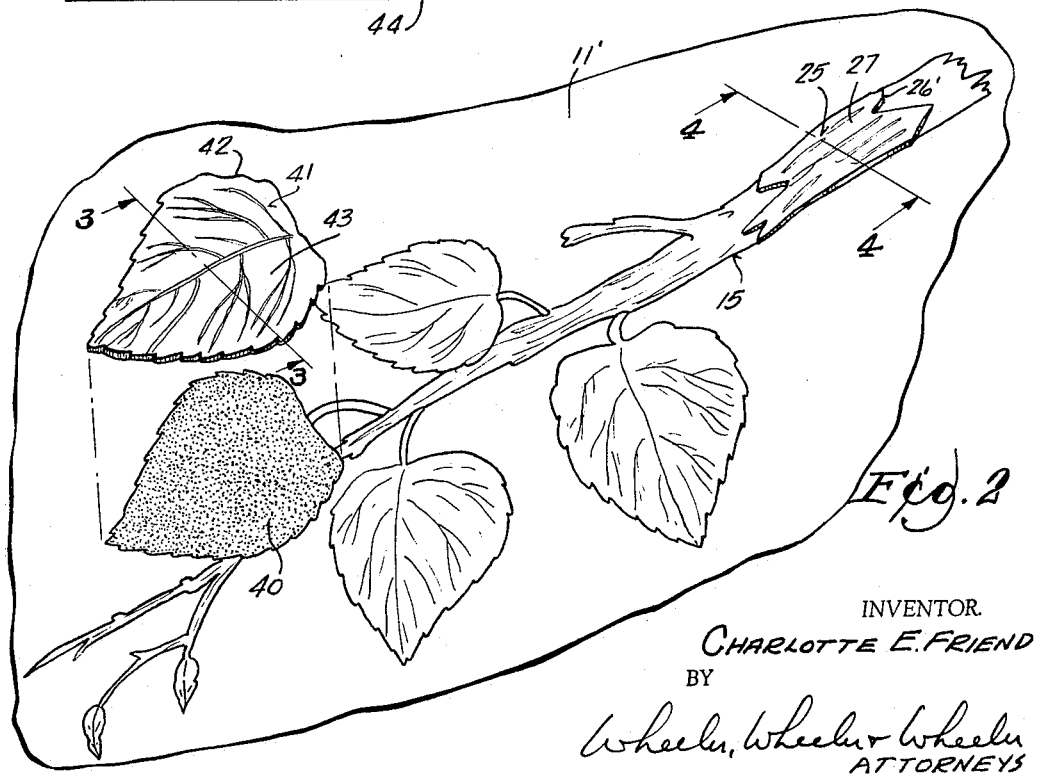
INVENTOR.
CHARLOTTE E. FRIEND
BY
Wheeler, Wheeler & Wheeler
ATTORNEYS

United States Patent Office 3,274,706
Patented Sept. 27, 1966

3,274,706
BOOK HAVING PLASTIC PAGES AND ADHERENT PLASTIC OVERLAYS
Charlotte E. Friend, Milwaukee, Wis.
(311 S. Water St. East, Fort Atkinson, Wis.)
Filed Apr. 2, 1964, Ser. No. 356,730
1 Claim. (Cl. 35—20)

This application relates to a book having plastic pages and adherent plastic overlays.

The invention consists of a book containing information concerning the identification of trees or plants, the book having pictures of the individual trees and plants to be identified. The book is further provided with a supply of plastic overlays which respectively fit certain distinctively shaped portions of the pictures which register with features which permit identification of the tree or plant. For instance, in the case of a tree, separate overlays may be provided for the bark, the leaves, the flowers, and the fruit. In each case, the overlay may be printed in the appropriate color and may be textured in a faithful reproduction of the surface features and surface texture of the portion of the tree or plant represented by the overlay, permitting the user to learn to identify the subject by its texture as well as its appearance. Each such overlay has a characteristic shape which will match the shape of only one identified area in the text. If desired, pockets may be provided to receive the overlays.

In the drawings:

FIGURE 1 is a perspective view showing a book opened to a page provided with the features of my invention.

FIGURE 2 is an enlarged perspective view showing a broken away portion of a page of the book.

FIGURE 3 is an enlarged cross-sectional view of an overlay taken on line 3—3 of FIG. 2.

FIGURE 4 is an enlarged detail view in cross-section taken on line 4—4 of FIG. 2.

The drawings show a book 10 having pages 11 bearing printed pictures 12, 13, 14 and 15 of the subject matter to be identified. Various portions of pictures 12 and 15 are provided with areas which may be colored, numbered, or otherwise distinctively identified. Area 20 on page 11 and area 21 on page 11' relate respectively to the bark of the trees which are pictured. Overlay 22 represents the bark of the tree shown in pictures 12 and 14. Its upper surface 23 is provided with a surface having characteristic irregularities like those of the surface of the pictured tree bark and is colored like the surface of the actual tree bark. The lower surface of the overlay is flat and is composed of a plastic which will adhere electrostatically or otherwise to portion 20 of the picture 12 on page 11. The outline 24 of the area 20 is irregular and the outline 24' of overlay 22 conforms thereto exactly so that an overlay representing a given type of bark and having a given texture 23 will conform precisely to the corresponding area 20 of picture 12.

In like manner, overlay 25 has a peripheral boundary 26' which conforms exactly to the distinctive boundary 26 of picture area 21 in picture 15 (FIGS. 3 and 4). The upper surface 27 of overlay 25 is textured differently than the upper surface 23 of overlay 22, and represents the bark of the tree shown in picture 15. This structure permits the user to identify the tree by touch, and to identify it more accurately by sight than could be achieved with a printed image alone. Moreover, the overlay 22 or 25 may be removed from the printed page 11 or 11' and carried to a particular tree to permit comparison which may be tactile as well as visual.

Picture 12 is also provided with a distinctively identified picture area 30 representing a leaf. The plastic overlay 31 is colored, textured, and veined like the natural leaf and has a periphery 32 corresponding to the shape of the natural leaf and to the shape of the picture 30. The upper surface 33 of overlay 31 bears all of the texture and vein characteristics, while the lower surface is flat and is adherent to the page bearing the picture 30.

Other overlays, not illustrated, may be provided to fit on all or a portion of the picture 13 of the flower or the picture 16 of the fruit or the picture 14 showing the characteristic shape of the entire tree.

A pocket 17 may be provided on page 11 or on book cover 18 to receive the overlays at such times as they are not adherent to picture areas such as 20, 21, 30 and 40.

In FIG. 2, picture area 40 and overlay 41 represent a leaf of a different species than picture area 30 and overlay 31 of FIG. 1. Accordingly, the texture and veins impressed on the surface 43 of overlay 41 are different from the texture and veins impressed on the surface 33 of overlay 31, and the periphery 42 corresponds to the shape of a leaf illustrated in picture 15, which is different from the periphery 32 of a leaf of the species illustrated in picture 12. Accordingly, the overlays 31 and 41 are not interchangeable; but will only fit their respective areas 40 and 30. In the case of leaves which are generally similar in outline, the picture 30 may be drawn to a different scale than picture 40 so that the similarity of outlines is no longer dominant. This is shown by FIGS. 1 and 2.

Thus it may be seen that applicant has provided a structure in which the upper surface of the plastic overlay is provided with shape, color, texture and surface features corresponding to the same elements of a natural object such as a tree, and with a bottom surface 28 or 44 which is adherent to a page bearing a printed image of the same subject. The periphery of the overlay is of a unique shape and size, in each case corresponding only to one of the picture areas which are especially identified with the picture bearing the information identifying a particular subject, and each overlay provides the means for identifying the subject both visually and by touch.

In case of blind children, the identification may consist of Braille writing, in which case the child can learn to correctly identify natural objects without the necessity of visiting those objects for the purpose. Furthermore, the overlays facilitate the identification of natural objects by permitting direct comparison of the texture and surface features of the overlay with the texture and features of a natural object by both sight and touch.

In the preferred form of the invention, the adhesion between the overlay and the page is achieved electrostatically, but other modes of adhesion may be used. Many are known, the adhesion of certain types of cloth being one example and the use of pressure sensitive coatings such as latex being another. However, it is preferred that the adhesion be such as to permit free removal of the overlay for direct comparison with the natural object.

I claim:

In combination, a page bearing a picture of a natural object, a portion of the picture area having a distinctive outline, and an overlay having a flat lower surface, said lower surface being permanently removable and mutually adherent to the page, at least the upper surface of said page and the lower surface of said overlay being comprised of plastics which are electrostatically adherent to each other, said overlay being further provided with an outline corresponding substantially exactly to the distinctive outline of said portion of the picture area, the upper surface of said overlay being provided with irregular surface features corresponding tactilely to the pictured portion of the natural object represented by said overlay and being colored like the said natural object, a plurality of said pages being bound into a book, said book being provided with a pocket adapted to store said overlays.

(References on following page)

References Cited by the Examiner

UNITED STATES PATENTS

| | | | |
|---|---|---|---|
| 1,381,957 | 6/1921 | Anderson | 35—41 |
| 1,480,458 | 1/1924 | Mershon | 35—8 |
| 1,562,225 | 11/1925 | Garman | 35—26 |
| 1,913,850 | 6/1933 | Oberdorfer | 723—157 |
| 2,293,887 | 8/1963 | Chamberlain | 35—27 X |
| 3,094,791 | 6/1963 | Thiebes | 35—26 |

FOREIGN PATENTS

| | | |
|---|---|---|
| 649,404 | 1/1951 | Great Britain. |
| 740,499 | 11/1955 | Great Britain. |

EUGENE R. CAPOZIO, *Primary Examiner.*

JEROME SCHNALL, *Examiner.*

H. S. SKOGQUIST, *Assistant Examiner.*